United States Patent [19]
Garrett

[11] Patent Number: 4,584,720
[45] Date of Patent: Apr. 22, 1986

[54] OPTICAL COMMUNICATION SYSTEM USING PULSE POSITION MODULATION

[75] Inventor: Ian Garrett, Woodbridge, England

[73] Assignee: British Telecommunications, London, England

[21] Appl. No.: 527,813

[22] Filed: Aug. 30, 1983

[30] Foreign Application Priority Data

Sep. 2, 1982 [GB] United Kingdom ............... 8225007
Nov. 23, 1982 [GB] United Kingdom ............... 8233396

[51] Int. Cl.⁴ ............................................. H04B 9/00
[52] U.S. Cl. .................................... 455/608; 455/609; 455/611; 370/8; 370/10; 375/23; 332/9 R
[58] Field of Search ............... 375/23; 370/8, 10; 455/608, 609, 611; 332/9 R; 360/29; 340/861; 377/20; 372/108

[56] References Cited
U.S. PATENT DOCUMENTS

| | | | |
|---|---|---|---|
| 3,727,061 | 4/1973 | Dworkin | 370/8 |
| 3,956,626 | 5/1976 | Ross | 455/608 |
| 3,995,231 | 11/1976 | Johnson et al. | 372/108 |
| 4,136,258 | 1/1979 | Workman | 375/23 |
| 4,300,236 | 11/1981 | Gilmour | 375/23 |
| 4,468,746 | 8/1984 | Davis | 377/20 |

*Primary Examiner*—Joseph A. Orsino, Jr.
*Assistant Examiner*—Timothy K. Greer
*Attorney, Agent, or Firm*—Cushman, Darby & Cushman

[57] ABSTRACT

An optical communication system using digital pulse position modulation employs a mode locked laser with a mode locking frequency equal to the time slot frequency of the modulation and means dependent on groups of consecutive digits of the data to be transmitted to select pulses from the laser for transmission. In one example, 4-bit groups from the data for transmission select one out of 20 pulses from the laser thus leaving a guard interval of 4 time slot periods between position modulated pulses.

An encoder and a decoder for converting between digitally encoded data and position modulated pulses are described. These use a counter driven by clock pulses at the time slot frequency to supply inputs alternately to two encoding logic circuits or two multiplexers.

10 Claims, 6 Drawing Figures

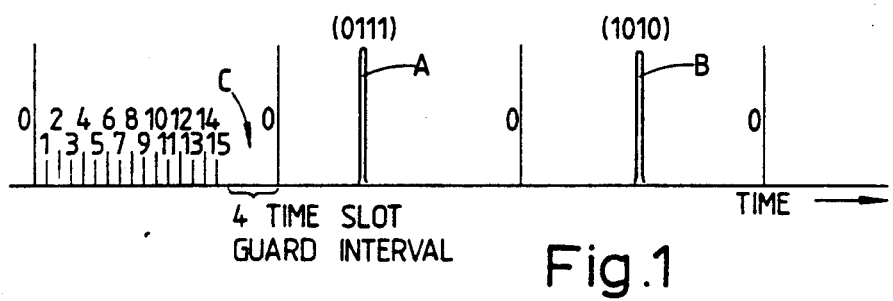
Fig.1
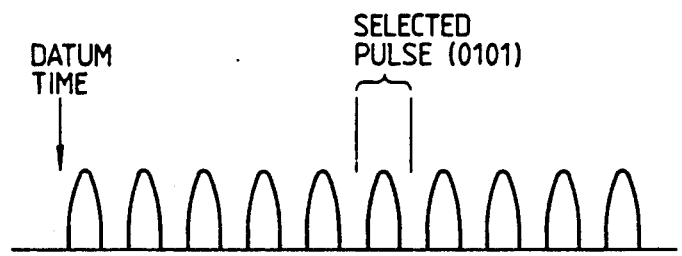
Fig.2
Fig.3

OPTICAL COMMUNICATION SYSTEM USING PULSE POSITION MODULATION

This invention relates to optical communication and in particular to the transmission of information by a modulated light beam propagated along an optical fibre.

Among the advantages of optical communication is the bandwidth of a monomode optical fibre, but it is not fully exploited by direct digital communication systems, even those operating at high data rates, e.g. 400 M bit/s. The use of pulse-time modulation systems enables the unexploited bandwidth to increase the signal-to-noise ratio and one form of pulse time modulation is pulse position modulation which has been used to convey both analogue and digital information. This is particularly efficient in its use of light energy.

Digital transmission has advantages when information from different sources is to be transmitted. In digital pulse position modulation a group of binary digits, say 4, are represented by a single pulse occurring in one of a series of time slots, 16 in this instance. Usually a guard interval is provided between consecutive series of time slots so as to provide some kind of synchronising indication and to avoid difficulties which could arise when a pulse in the latest time slot of one series is followed by one in the earliest time slot of the next.

It is an object of the present invention to provide an improved optical communication system using digital pulse position modulation.

According to one aspect of the present invention there is provided transmission apparatus for an optical communication system using digital pulse position modulation in which each pulse is in one of a plurality of time slots and represents a group of digits of input data, wherein the optical pulses are generated by a mode locked laser with a mode locking frequency equal to the time slot frequency of the modulation, and optical pulses from the laser are selected and coupled for transmission in dependence upon consecutive groups of digits of the input data.

The input data may be in binary code and a group of bits may be represented by each pulse of the pulse position modulation, so that the time slot frequency is equal to or greater than $2^n/n$ times the bit frequency. Typical values for n are in the range 4 to 8. A time slot frequency greater than $2^n/n$ would be needed to provide a guard interval setting the minimum time period between successive pulses. For example, if $n=4$, the time slot frequency may be chosen to be 5 times the bit frequency giving a guard interval of 4 time slot periods. The selection of optical pulses from the modelocked laser for transmission may be effected by a cavity dumper controlled by groups of digits of the input signal.

According to a second aspect of the present invention there is provided conversion means for converting digital data between a first form comprising position modulated pulses occurring in particular time slots representing by the time slots in which they occur respective groups of digits and a second form comprising the groups of digits, the means including a clock pulse generator generating clock pulses at the time slot frequency, counting means having at least as many stages as there are digits in a group and counting in the same radix as the digits, means for causing the counting means to count clock pulses from a datum time until the time of occurrence of a position modulated pulse when the counting means records the groups of digits corresponding to the time position of the pulse, and means for deriving output data in one form from input data in the other form in response to the state of the counting means.

The conversion means may be for converting groups of digits of input data into position modulated pulses occurring in particular time slots representing respective digit groups. The means may include storage means for a group of digits of the input data, counter means having at least as many stages as there are digits in a group and counting in the same radix as the digits of the input data. The means for deriving output data may include a plurality of digit comparison circuits respectively connected to compare digits of the group stored in the storage means with corresponding digit stages of the counter means, and logic means connected to the outputs of the digit comparison circuits and arranged to produce an output pulse when digits stored in the stages of the counter means are the same as the respective digits of the group stored in the storage means.

The conversion means may include two or more storage means of which one storage means may be arranged to receive a group of digits for storage whilst the group of digits stored in another storage means is being compared with the state of the counting means.

The conversion means may alternatively be for converting position modulated pulses occurring in particular time slots representing respective groups of digits into the corresponding groups of digits. The counting means may include means for resetting it to a predetermined initial value at datum times. The means for deriving output data may include means for reading groups of digits recorded by the counting means when a position modulated pulse occurs and producing the group of digits as output.

There may be provided two storage means to which the groups of digits are transferred alternately and from which the digits of the groups are produced as output serially.

The time slot frequency may be sufficiently high in relation to the repetition rate of the groups of digits of the input data that the counter means can assume all possible combinations of digits in a group of digits within a period of time which is significantly less than the time interval from the start of one group of digits to the start of the next in the input data.

According to a third aspect of the present invention there is provided a method of transmitting digital data including deriving from groups of the digits of the data position modulated electrical pulses respectively representing the groups of digits by counting clock pulses at a time slot frequency until the count is equal to the group of digits and then generating the position modulated electrical pulse, producing a succession of pulses of optical energy at the time slot frequency from a mode locked laser, selecting and coupling for transmission optical energy pulses from the succession in response to the position modulated pulses, receiving the transmitted optical energy pulses and deriving from them position modulated electrical pulses, converting each position modulated electrical pulse into a corresponding group of digits by counting clock pulses at the time slot frequency for the time interval between a datum time and the occurrence of the electrical pulse and using the count reached as the group of digits, and producing as output the groups of digits.

Noise can give rise to two different kinds of error, referred to respectively as "wrong slot" and "false alarm" errors. A "wrong slot" error occurs when a position modulted pulse appears to the receiver to lie in a slot next to the slot in which it actually lies because of distortion of the pulse by noise. In a "false alarm" error a large noise spike greater than the receiver threshold is taken by the receiver to be a signal pulse in the particular time slot and a later occurring true signal pulse is ignored.

It can be shown that if a suitable design of filter is included in the receiver the chances of occurrence of both kinds of error can be reduced. Consideration of the filter design is included in, for example, a paper entitled "Matched filter receivers" read by John J. O'Reilly at a Colloquium on the "Calculus of Variations" held at the University of Essex on the Nov. 25, 1980. A particular filter design which has been found to be satisfactory and is described in the above paper consists of a whitened filter matched to the signal pulse connected in parallel with a whitened filter matched to the time derivative of the signal pulse. Alternatively the filter may be a whitened matched filter connected in series with a proportional-pulse-derivative controller. This form of filter can be used with advantage in both direct detection and heterodyne receivers.

In order that the invention may be fully understood and readily carried into effect it will now be described with reference to the accompanying drawings of which:

FIG. 1 is a diagram of one example of digital position modulated pulses:

FIG. 2 is a table relating time slots to 4 bit groups;

FIG. 3 is a diagram illustrating the generation of position modulated pulses as used in the system shown in FIG. 4;

Figure 4:
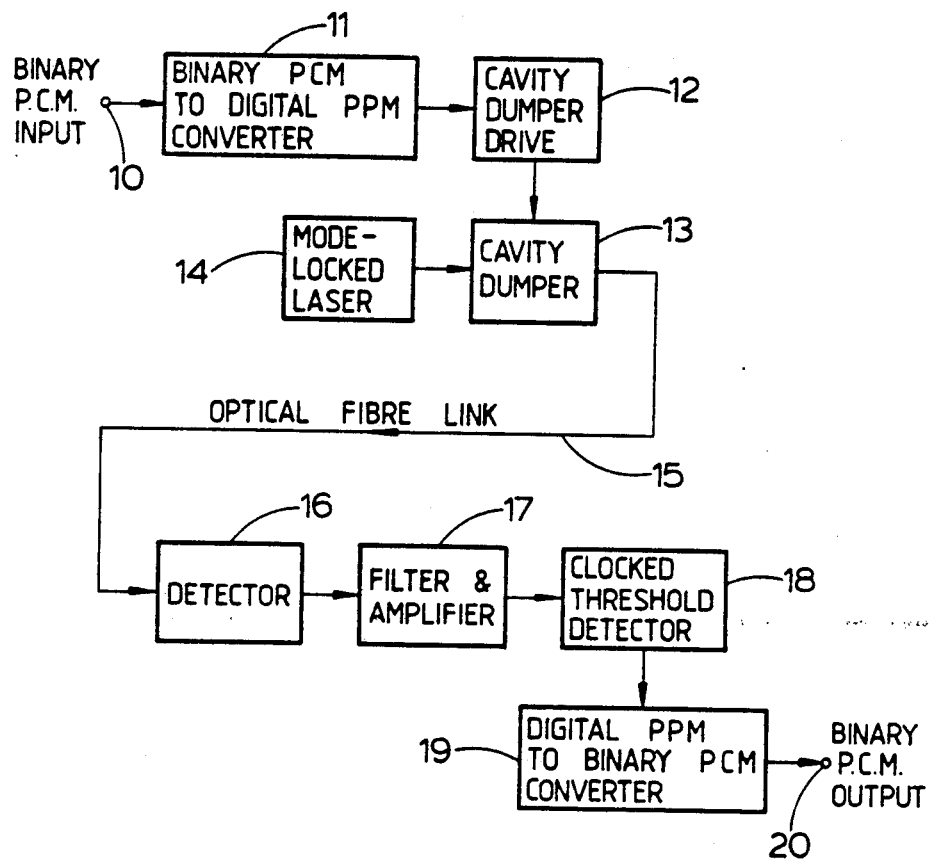
FIG. 4 is a block diagram of an optical communication system.

The drawings illustrate a particular example of a pulse position modulation system in which 4-bit groups of serial binary data are represented by single pulses in one of 16 time slots. Each series of 16 time slots is separated from the adjacent series by guard intervals of duration equal to 4 time slots. Thus the 20 time slots comprising a series of 16 time slots and a guard interval of 4 time slots convey a 4-bit groups of the serial binary data, so that the time slot rate is 5 times the bit rate of the binary data. This is only one possible example and other examples might use 3-bit groups represented by single pulses in one of 8 time slots with a single or 4 time slot guard interval or 5 bit groups represented by single pulses in one of 32 time slots with a 3 time slot guard interval. Moreover the incoming data need not be binary.

FIG. 1 shows two position modulated pulses A and B respectively representing the 4-bit groups 0111 and 1010 and occupying time slots 7 and 10 of two adjacent series of 16 time slots. The start of each time slot 0 is marked by a vertical line and in the first series the start of each time slot is shown although for clarity no pulse is shown. In practice, only the pulses are transmitted and synchronisation of the receiver is effected by reference to the guard interval C on the basis that the start of time slot 0 is the latest possible consistent with the following 20 time slots containing only one pulse.

Each pulse represents 4 bits and FIG. 2 shows the allocation of time slots to the sixteen possible 4-bit groups in accordance with straightforward scale of 2 counting. Alternatively other allocations could be used, e.g. according to a Gray code.

One way in which the position modulated pulses can be generated is to generate a series of pulses spaced at the time slot intervals and to select that one of the pulses which occurs in the particular time slot representing the 4-bit group to be transmitted. FIG. 3 shows a number of such pulses which start at a datum time and correspond respectively to 0, 1, 2, 3 etc. The pulse shown as being selected in FIG. 3 is that corresponding to time slot 5 which represents the 4-bit group 0101.

A series of equispaced light pulses can be generated by a mode-locked laser, and in accordance with the present invention the operation of the laser is arranged to be such that the light pulses are generated at the time slot intervals. A pulse is selected by coupling it to the optical fibre link for transmission by a cavity dumper. Non-selected pulses continue to circulate in the laser cacity. The details of the design of the laser and the cavity dumper are not given in the specification since they can take any suitable one of the well-known forms for these devices.

FIG. 4 shows a black diagrammatic form one example of optical communication system using the above described method of generated position modulated pulses. In FIG. 4 serial binary PCM data is applied via an input 10 to a converter 11 which converts binary PCM data to digital PPM (pulse position modulation) data. The output of the converter 11 is applied to a drive unit 12 for a cavity dumper 13. Light pulses from a mode-locked laser 14 are applied to the cavity dumper 13 so that at the output of the dumper 13 appear only those pulses which represent the group of incoming binary data. Assuming that the system is operated on the pulse position modulation described with reference to FIG. 1, 2 and 3, the output of the dumper 13 consists of one pulse out of every 20 generated by the laser 14, the position of the one pulse representing 4 bits of the incoming data. The pulses from the dumper 13 are applied via an optical fibre link 15 to a detector 16 included in a receiver for the data. The output of the detector 16 which is an electrical signal corresponding to the light pulses which it receives is applied to a filter and amplifier unit 17 the function of which is to modify the received signals so that the chances both of "wrong slot" and "false alarm" errors as defined above are reduced. The filter design consists of a whitened filter matched to the shape of the signal pulse connected in parallel with a second whitened filter matched to the time derivative of the signal pulse. This form of filter affects the shape of the received pulse so that the effects of noise which would otherwise adversely influence the apparent timing of the pulse or would appear as spurious signal pulses are reduced. The output of the unit 17 is applied to a clocked threshold detector 18 which ascertains the time slot in which the particular pulse lies and also serves to discriminate against spurious pulses due to noise. The cleaned up pulses issuing from the detector 18 are applied to a digital PPM to binary PCM convertor 19 which produces as output serial binary PCM data at a terminal 20.

The components 10 to 14 of FIG. 4 constitute a transmitter of position modulated pulses which are received by a receiver constituted by components 16 to 20. The detector 16 may be a simple direct detector or it may be a heterodyne detector. The clocked threshold detector 18 may be arranged to be adaptive so that its clocking is matched to the timing of the incoming pulses. On the basis of the system described with reference to FIGS. 1, 2 and 3, one pulse is emitted in each 20 time slots by the transmitter and this information can be used to control the timing of a clock generator circuit in the detector 18 provided that allowance is made for the fact that the actual time of a pulse will vary in each 20 time slot period depending on the data which it is conveying. It is of course necessary to ensure that the threshold detector 18 is synchornised with the timing of the pulses since it is the position of the pulses in time which carries the information. This synchronisation can be carried out on the basis of the fact that only 1 pulse should occur in a 20 time slot interval so that, if 2 pulses occur in such an interval, the second pulse can be used to set the time of the start of the next interval. By making the synchronisation adaptive to the incoming pulses in this way the need for additional synchronising signals is avoided and the greatest possible information density can be carried by the channel.

Figure 5:
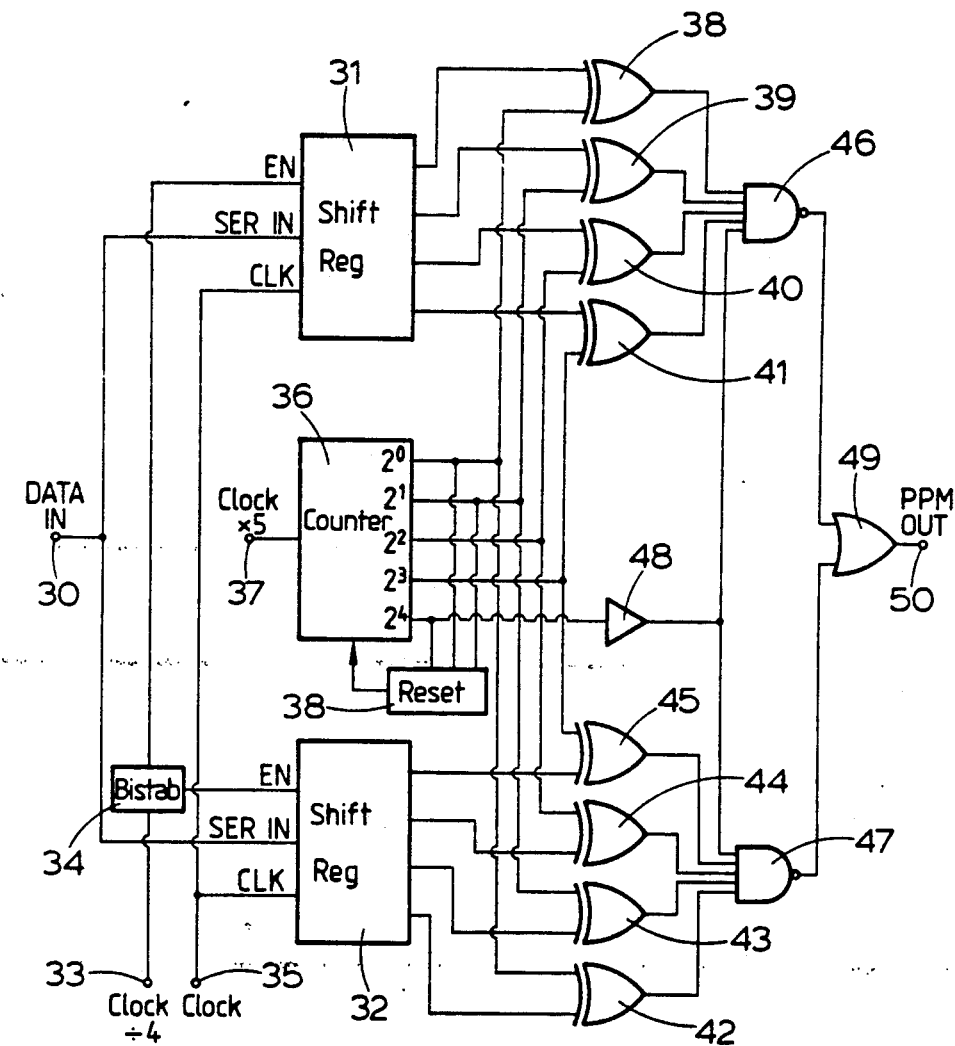
FIG. 5 is a diagram of one example of a serial binary code to digital pulse position modulation code converter.
Figure 6:
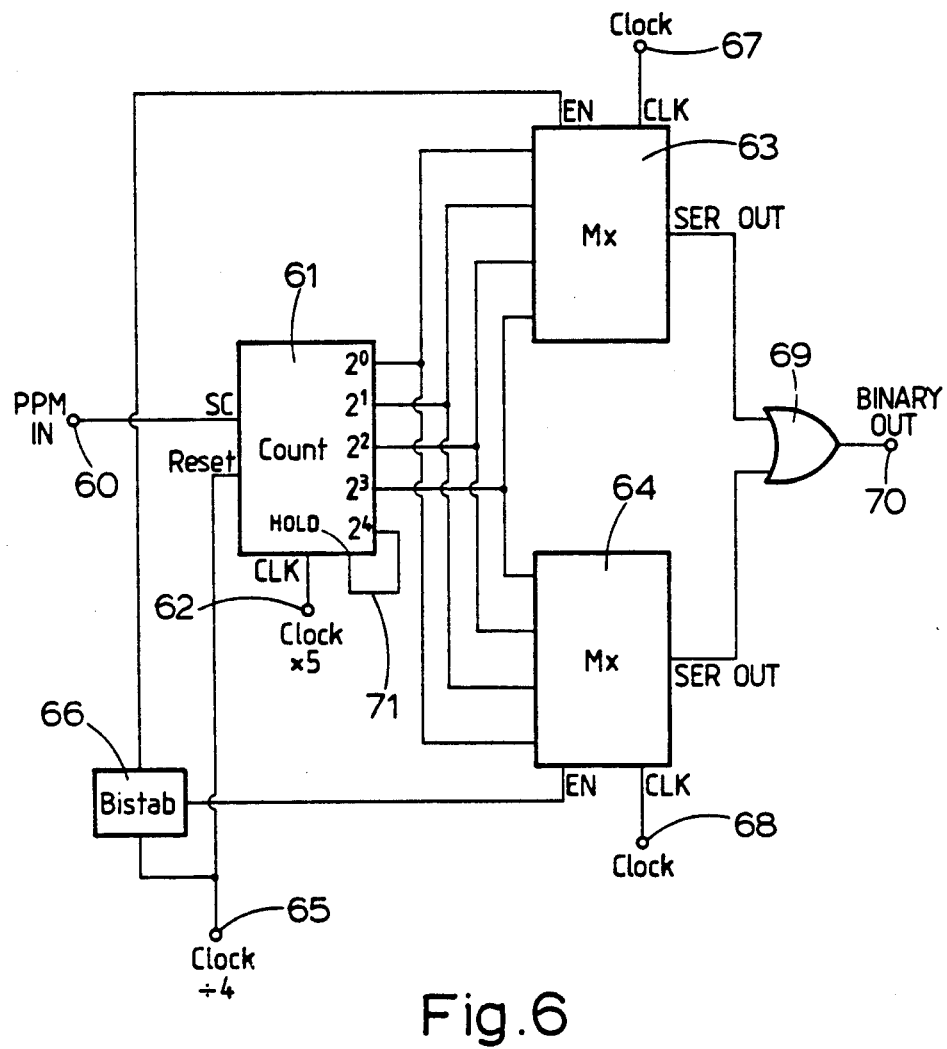
FIG. 6 is a diagram of one example of a digital pulse position modulation code to serial binary code converters.

The convertors 11 and 19 which serve to convert incoming binary PCM data into digital PPM data and back again respectively may be simply realised using the circuits shown in FIGS. 5 and 6. FIG. 5 which shows the convertor 11 receives the serial PCM data via a terminal 30 which is connected to the inputs of shifting registers 31 and 32. A quarter rate clock signal applied to a terminal 33 alternately sets and re-sets a bi-stable circuit 34 having 2 outputs respectively connected to enabling inputs of the shifting registers 31 and 32 so that successive groups of 4 bits of the incoming data are stepped alternately into the two shifting registers. A clock signal of the same rate as the incoming data is applied via a terminal 35 connected to the 2 shifting registers 31 and 32 to shift the incoming serial data into the registers as it is received. A 5 stage binary counter 36 receives a clock signal of 5 times the clock rate of the incoming data via a terminal 37 and produces a 5 bit parallel output. A re-set circuit 38 is provided connected to the outputs of the circuit 36 so that as the output changes from 10011 to 10100 (i.e. from 19 to 20) the circuit 38 emits a signal which causes the counter 36 to be re-set to 0. The 4 outputs of the counter 36 for all but the digit of greatest significance are connected to inputs of respective ones of 2 sets of 4 EXCLUSIVE OR gates 38, 39, 40, 41 and 42, 43, 44, 45. The 4 outputs of the shifting register 31 are connected respectively to inputs of the gates 38 to 41. The 4 outputs of the shifting register 32 are connected respectively to inputs of the 4 gates 42 to 45. The outputs of the gates 38 to 41 are connected to 4 inputs of a 5 input NAND gate 46 and the outputs of the 4 gates 42 to 45 are connected to 4 inputs of a 5 input NAND gate 47. The 5th input of the gates 42 to 47 is connected to the most significant bit output of the counter 36 via an inverter 48. The outputs of the gates 46 and 47 are connected to an OR gate 49 having its output connected to an output terminal 50 for the circuit.

In the operation of the circuit of FIG. 5 4-bit groups of the incoming serial data are stored alternately in shifting registers 31 and 32, being stepped into the registers by the clock signal applied to the terminal 35. Suppose that a 4-bit group is stored in the register 31 then starting from a datum time set by the quarter clock applied to the terminal 33, the counter 36 starts to count the 5 times rate clock pulses applied to the terminal 37. The set of gates 38 to 41 detects when the number reached by the counter 36 is equal to the 4-bit number stored in the resiter 31, and when this occurs all 4 of the gates 38 to 41 will produce an output which causes the NAND gate 46 to emit a pulse which forms the output of the circuit.

Whilst the encoding of the 4-bits group stored in the register 31 is taking place the next group of 4-bits is being entered into the register 32 under control of the output from the bi-stable 34. At the end of the 20 time slot interval which is equal to the interval between the lock pulses applied to the terminal 33, the output of the counter 36 is compared with the 4-bit group stored in the register 32 by the gates 42 to 45 in the same way as the gates 38 to 41 compared the group stored in the register 31 with the output of the counter 36. Meanwhile the next 4-bit group is entered into the register 31.

Beacuse the interval between the datum times is 20 time slot intervals and only 16 of those time slots are used as possible positions for pulses representing data it is necessary for the counter 36 to be able to count up to 20 when it is re-set to 0 by the circuit 38. In order to avoid spurious pulses being produced by the gates 46 and 47 in response to counts of 16, 17, 18 or 19 from the counter 36 when the 4-bit group stored in one of the registers 31 and 32 is 0, 1, 2 or 3, the most significant digit of the output counter 36 is applied after inversion by the invertor 48 to block the gates 46 and 47.

In the same way as the convertor of FIG. 5 operates to convert serial PCM data into pulse position modulated data by comparing a group of bits of the PCM data with the total reached by a counter and producing an output when the two groups of bits are the same so the convertor of FIG. 6 uses a counter to reach a particular total at the time of occurrence of a received position modulated pulse to produce the required group of bits for the output serial PCM data. The convertor of FIG. 6 receives the position modulated pulses at a terminal 60 which is connected to the stop counting input of a counter 61 to which clock pulses at the same frequency as the time slots are applied via a terminal 62. The counter 61 which has 5 binary stages has the 4 stages of lower significance connected to multiplexers 63 and 64. Pulses at a quarter of the digit rate are applied via a terminal 65 to re-set the counter 61 to 0 preparatory for counting the pulses applied to the terminal 62 to record a total representing the time of occurrence of the incoming position modulated pulses received at terminal 60. The terminal 65 is also connected to the input of a bi-stable circuit 66 having 2 outputs connected respectively to the enable inputs of the multiplexers 63 and 64. Pulses at the digit rate are applied via terminals 67 and 68 respectively to the multiplexers 63 and 64 to clock out from those multiplexers the 4 bits stored in them. The serial outputs from the multiplexers 63 and 64 are combined by an OR gate 69 so that a serial PCM output signal appears at terminal 70.

In order to avoid spurious outputs which could arise due to the occurrence of noise pulses during the guard interval the most significant digit output of the counter 61 is applied via a conductor 71 to a hold input of the counter so as to prevent it counting beyond 16.

In the operation of FIG. 6 the counter 61 is re-set to 0 by a pulse applied to terminal 65 and starts to count clock pulses at 5 times the digit rate applied to terminal 62. When a position modulated pulse occurs at the input 60 the counter 61 will stop at which time it records a 4-bit number representing the time of occurrence of the pulse. This 4-bit number is recorded in one of the multiplexers 63 and 64 depending upon which of these is enabled by an output from the bi-stable 66. Suppose that it is the multiplexer 63 which is enabled. The same pulse applied to the terminal 65 which causes the bi-stable 66 to enable the multiplexer 63 to record the 4-bit number reached by the counter 61 re-sets the counter 61 to 0 to re-start the counting of pulses applied to the terminal 62. The 4 bits recorded in the multiplexer 63 are then read out serially by the clock pulses applied to the terminal 67 and appear in serial form at the terminal 70. The next count reached by the counter 61 when a position modulated pulse occurs will be recorded by the multiplexer 64 and read out in serial form from it by the pulses applied to the terminal 68.

Although the invention has been described with reference to a specific embodiment, it will be appreciated that modifications can be made to the embodiment described without departing from the invention. For example, instead of using binary code, other coding could be employed both for the input and output data and for the counters.

The invention cn be used with monomode optical transmission to enable a greater distance to be provided between repeaters, so that the number of repeaters for a given length of transmission path can be kept to a minimum.

What we claim is:

1. An optical pulse position modulated digital data signal transmitter comprising:
   a mode-locked laser producing recurrent optical pulses at a predetermined frequency;
   optical control means associated with said mode locked laser for optically outputting a selected one of said optical pulses in response to a respectively corresponding supplied electrical control signal;
   input processing means electrically coupled to said optical control means for recurrently accepting groups of n binary digital data bit signals having $2^n$ possible data values and for producing said electrical control signal in synchronism with the occurrence of a selected one of a group of N optical pulses, N being an integer greater than $2^n/n$,
   wherein said predetermined frequency of recurrent optical pulses produced by the mode-locked laser is greater than $2^n/n$ times the occurrence rate of said binary digital data bit signals and is also synchronized with the occurrence rate of said groups of n bit signals.

2. A method of transmitting digital data having successive digits, said method including:
   deriving, from groups of digits of the data, first position modulated electrical pulses respectively representing the groups of digits by counting clock pulses at a time slot frequency until the count has a specific relationship to the group of digits and then generating one of said first position modulated electrical pulses,
   producing a succession of pulses of optical energy at the time slot frequency and in synchronization therewith from a mode locked laser,
   selecting and coupling for transmission one of N optical energy pulses from the succession in response to occurrences of said first position modulated pulses, N being an integer greater than one
   receiving the transmitted optical energy pulses and deriving from them second position modulated electrical pulses,
   coverting each second position modulated electrical pulse into a corresponding group of digital data digits by counting clock pulses at the time slot frequency for the time interval which occurs between a datum time and the occurrence of a second position modulated electrical pulse and using the count reached to generate the group of digital data digits, and
   producing as output the groups of digital data digits.

3. Transmission apparatus for an optical communication system using digital pulse position modulation in which each transmitted optical pulse is located in one of a plurality of time slots which occur at a predetermined time slot frequency and in which each optical pulse represents a group of digits of input data, said apparatus comprising:
   a mode locked laser with a mode locking frequency producing optical pulses at a rate equal to the time slot frequency and synchronized therewith, and
   means for selecting and coupling optical pulses from the laser for transmission in dependence upon the value of consecutive groups of digits of the input data such that only one of each N optical pulses is selected and coupled for transmission, N being an integer greater than one.

4. Apparatus according to claim 3, including:
   means for storing a group of digits of the input data,
   means responsive to the stored group of digits for producing a position modulated pulse occurring at a time instant within a time interval, which instant represents the stored group of digits, and
   said means for selecting and coupling for transmission being responsive to the position modulated pulse for selecting and coupling a corresponding one of the optical pulses generated during said time interval by the mode locked laser.

5. Apparatus according to claim 4 in which the means for selecting and coupling for transmission of the optical pulses from the laser includes a cavity dumper.

6. Apparatus according to claim 4 further comprising means for providing the input data in binary coded form, a group of digits containing n digits and there being $2^n$ possible time positions for the position modulated pulse.

7. Apparatus according to claim 6 wherein the input data is in serial coded form and the repetition frequency of the digits of the input data is an integral multiple of the reciprocal of the time interval.

8. Apparatus according to claim 6 wherein n is 4.

9. Apparatus according to claim 6 wherein the time interval is longer than the minimum necessary to accommodate the $2^n$ possible time positions, so that there is a time period longer than that between adjacent time positions between the latest possible time position in one interval and the earliest possible time position in the next interval.

10. Apparatus according to claim 9 wherein n is 4 and the time interval is of a length to accommodate 20 time positions.

* * * * *